(12) United States Patent
Fyson

(10) Patent No.: US 6,797,183 B1
(45) Date of Patent: Sep. 28, 2004

(54) METHOD OF TREATING WASTE EFFLUENT

(75) Inventor: John R. Fyson, Hackney (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/795,961

(22) Filed: Feb. 4, 1997

(30) Foreign Application Priority Data

Jan. 31, 1996 (GB) .............................................. 9601915

(51) Int. Cl.$^7$ .................................................. C02F 1/76
(52) U.S. Cl. ...................................... 210/759; 210/763
(58) Field of Search .............................. 210/198.1, 205, 210/759, 763

(56) References Cited

U.S. PATENT DOCUMENTS

| | | | | |
|---|---|---|---|---|
| 4,743,381 A | * | 5/1988 | Bull ........................... | 210/759 |
| 5,120,453 A | * | 6/1992 | Frame et al. ................ | 210/763 |
| 5,156,748 A | * | 10/1992 | Meunier et al. ............ | 210/763 |
| 5,273,663 A | * | 12/1993 | Kurek et al. ................. | 210/763 |
| 5,338,463 A | * | 8/1994 | Yan ............................. | 210/763 |
| 5,552,063 A | * | 9/1996 | Yan ............................. | 210/763 |
| 5,635,078 A | * | 6/1997 | Yan ............................. | 210/763 |

FOREIGN PATENT DOCUMENTS

| | | |
|---|---|---|
| DE | 3635219 | 4/1988 |
| EP | 0 362 429 | 4/1990 |
| FR | 2715924 | 8/1995 |
| JP | 56-46144 | 10/1981 |
| JP | 3-36597 | 5/1991 |

OTHER PUBLICATIONS

English Translation of DE 36 35 219 A1.*
Patent Abstracts of Japan, vol. 096, No. 002, Feb. 1996.
Patent Abstracts of Japan, JP 07 265870A (Kansai Electric Power Co. Inc: The Others:01, Oct. 17, 1995.

* cited by examiner

Primary Examiner—Betsey Morrison Hoey
(74) Attorney, Agent, or Firm—John R. Everett; Chris P. Konkol

(57) ABSTRACT

This invention provides a method of treating waste effluent, particularly photographic effluent, containing reduced species such as thiosulphate or sulphite, by oxidation with hydrogen peroxide or a compound capable of releasing hydrogen peroxide, in the presence of a catalyst therefor. The invention is characterized in that the catalyst is immobilized on a substrate. The catalyst may be selected from chromate, vanadate and preferable molybdate or tungstate and the substrate may comprise an ion exchange material, especially an anion exchange material. The invention further provides a holding tank apparatus (10) or a conduit apparatus (20) for carrying out this method.

The invention is particularly appropriate for use with fixer from redox-amplification processes. With conventional solutions with higher concentrations of fixer a soluble alkali, especially potassium bicarbonate, may be combined with the oxidizing agent and stored for at least 4 weeks without decomposition, whereby the pH of the final effluent is rendered environmentally acceptable.

9 Claims, 6 Drawing Sheets

METHOD OF TREATING WASTE EFFLUENT

FIELD OF THE INVENTION

The present invention relates to a method of treating waste effluent, in particular photographic effluent, which contain reduced species, especially sulphur-oxygen species, such as, for example, thiosulphate or sulphite. The present invention also embraces apparatus for performing such methods of treatment.

BACKGROUND OF THE INVENTION

It is usual for photographic effluent for both black-and-white and color processing to contain one or more reduced sulphur-oxygen species. Thiosulphate or "hypo" is commonly used as a fixing agent, and sulphite ions are often included in developer solutions and/or stop/clearing baths as a preservative scavenger for oxidized developing agent. Sulphite is also known as a fixing agent DE-A-3635219 to AGFA-GEVAERT AG discloses treating dilute aqueous solutions of thiosulphate by oxidation with hydrogen peroxide in the presence of a chromium, vanadium, tungsten or molybdenum compound as catalyst and discloses that molybdate is preferred. It is desirable to oxidize thiosulphate in photographic effluent before discharging the effluents to a sewage system, in order to reduce the chemical oxygen demand (COD) of the effluent.

Problem to be Solved by the Invention

A problem with the treatment method disclosed by DE-A-3635219 is that, while the COD of the thiosulphate-containing photographic effluent is reduced, transition metal contaminants are added to the effluent as catalyst which are subsequently discharged into the environment. This is clearly undesirable for environmental reasons, and is also an inefficient use of the transition metals. It is an object of the present invention to provide an improved treatment method for waste effluent, and in particular photographic effluent, containing reduced species, which does not involve the discharge of transition metal species to the environment and in which the transition metal species can be reused.

SUMMARY OF THE INVENTION

According to one aspect of the present invention therefore there is provided a method of treating waste effluent containing reduced species, by oxidation with hydrogen peroxide, or a compound capable of releasing hydrogen peroxide, in the presence of a catalyst therefor, characterized in that said catalyst is immobilized on a substrate therefor.

The reduced species may generally be a sulphur-oxygen species, typically as thiosulphate or sulphite.

Said catalyst may be selected from molybdate, tungstate, chromate and vanadate, although tungstate and especially molybdate are preferred.

Typically the substrate will constitute a porous mass which permits permeation of the photographic effluent into its interstices, thereby presenting a large surface area of catalyst to the effluent. Said substrate may be anionic, and in a particular aspect of the present invention the substrate comprises an anion exchange material. In some embodiments, a mixture of anion and cation exchange materials may be used. The material may typically be a polymeric resin, especially a polyacrylic or polystyrene resin, or clay or zeolite-type material.

In another aspect, the present invention contemplates a photographic development process in which effluent from one or more of the development steps are treated continuously or batch-wise by the method according to the present invention. Usually, the effluent from each stage will be combined and treated together. Said development process may be a redox-amplification (RX) process which is performed upon a photographic element containing a reduced silver lay-down density as compared with conventional silver halide photographic materials. As will be well known to a person skilled in the art, hydrogen peroxide is employed in the development step of an RX process, in which case it may be unnecessary to add additional peroxide to the photographic effluent. Of course, additional peroxide may be added to the effluent if required.

The above method is therefore particularly appropriate for use with dilute solutions containing fixer, for example those with less than about 20 g thiosulphate (based on ammonium thiosulphate), and hence is suitable for RX developed images.

However it has been found that with those fixer solutions wherein the amount of sulphur-oxygen species is high, i.e. conventional solutions such as those used in x-ray and graphic arts, and wherein sufficient peroxide is added to effect total oxidation to sulphate, the pH may become very acid (even as low as pH 1) which would be corrosive and unsuitable for discharge directly to sewers. The effluent could be subsequently neutralized by adding an alkali or base to the treated liquid in an amount appropriate to render the pH suitable for disposal, generally around pH 5–9, but this would require a separate process. Adding an alkali metal hydroxide or carbonate having a high pH to the added peroxide solution however causes the peroxide to decompose rapidly and therefore it cannot be stored therewith.

In accordance with a further aspect of the invention the above problem has been overcome by the addition to the peroxide solution of a soluble alkali whose conjugate acid has a pKa of <8.5, such as for example a soluble bicarbonate, alkanoate, e.g. acetate, or dihydrogen phosphate, in an amount approximately equivalent to the acid released in the decomposition reaction. Only very slight decomposition of peroxide over a period of several weeks results.

The soluble alkali is an alkali metal or ammonium salt, preferably a bicarbonate and more preferably the highly soluble potassium bicarbonate since the solubility of the alkali limits the amount of the acid that can be neutralized. At low pH the bicarbonate is converted to carbon dioxide which escapes from the solution thereby not adding to the salt content, which would be the case for other salts except for hydroxide or carbonate. Potassium bicarbonate is also the least polluting alkali, as it has no biological oxygen demand ($BOD_5$), and is also the cheapest, making it particularly suitable for practice in the present invention.

The pH of the effluent is raised by the above process but cannot exceed the natural pH of the alkali (about pH 9) so if there is a pump fault anywhere in the apparatus then the pH of the effluent can never go too high. Moreover provided an excess of alkali is added the actual amount required is not critical.

Conveniently the peroxide/alkali mixture may be stored as a combined oxidation/neutralizing solution which can then be pumped through a single pump and thence together with the fixer solution over the immobilized substrate as described hereinafter.

Compounds capable of releasing hydrogen peroxide include metal peroxides; compounds which include hydrogen peroxide in their crystal structure such as sodium percarbonate; other peroxy compounds such as sodium perborate and persulphate; or soluble organic peroxide, such as butyl peroxide or benzyl peroxide. The peroxide is added in an amount sufficient to cause oxidation of a substantial proportion of the reduced species and is conveniently hydrogen peroxide itself.

Where the photographic effluent is treated batch-wise, the catalyst may be disposed within a receptacle which is equipped with an inlet for introducing photographic effluent from the development process and an outlet for discharging treated effluent to waste. The outlet will be fitted with selectively operable closing means for closing the outlet during conduction of the treatment method, typically a valve.

Alternatively, the treatment method may be performed continuously on effluent delivered from the photographic development process. In another aspect of the present invention therefore the catalyst/substrate may be packed in a conduit which is arranged to receive photographic effluent in one end, and to deliver the treated photographic effluent from the other end. The flow rate of photographic effluent through the conduit will be adjusted such that the average residence time of effluent within the conduit is sufficient to oxidize a substantial proportion of the reduced sulphur-oxygen species contained in the effluent In the method wherein alkali is added to the peroxide in storage, the experimental set-up is as described hereinafter.

Where thiosulphate-containing effluents from the fixing stage are treated in accordance with the present invention, silver that has been complexed during fixing may be precipitated in the treatment stage. In some embodiments therefore silver-bearing precipitate may be separated from the treated photographic effluent before the effluent is discharged. For this, filtering or centrifuging means may be employed.

Advantageous Effect of the Invention

According to the present invention therefore a method of treating waste effluent containing reduced species, preferably containing sulphur-oxygen species, is provided which does not involve discharging transition metal species into a sewage system. This is advantageous from the environmental perspective, and also means that the transition metal catalysts can be reused which is more efficient in these materials as compared with the prior art processes. Unexpectedly, the present applicants have found that by supporting the transition metal catalysts on a substrate therefor, substantially less catalyst can be used as compared with the prior art processes without impairing the efficiency of the treatment reaction. For example, the treatment method of the present invention can be performed effectively using less than 1/100 parts by weight catalyst, and typically less than 1/250 parts by weight of sulphur-oxygen species. It was also found surprisingly that use of a supported catalyst in accordance with the present invention appeared to cause or allow more complete destruction of sulphur-oxygen species to sulphate as compared with prior art processes using unsupported catalyst.

A method is further provided wherein addition of alkali, such as potassium bicarbonate, to the peroxide solution in the case of effluents with high fixer concentration enables the pH of the treated effluent to be maintained at environmentally acceptable levels.

BRIEF DESCRIPTION OF THE DRAWINGS

FIGS. 1 to 4 of the accompanying drawings are graphs of pH verses time for reactions of photographic effluent with peroxide in the presence of a supported catalyst.

The invention will now be described with reference to the following Examples which are not to be construed as limiting in any way.

DETAILED DESCRIPTION OF THE INVENTION

EXAMPLE 1

A "mock" effluent from a low silver RX color process was made up from the following solutions:

Developer:

| | |
|---|---|
| 1-hydroxyethylidene-1,1'-diphosphonic acid | 0.6 g |
| Diethyltriaminepentaacetic acid | 2.0 g |
| Dipotassium hydrogen phosphate | 40.0 g |
| Hydroxylamine sulphate | 0.5 g |
| CD3 | 4.5 g |
| Hydrogen Peroxide (30%) | 2 ml |
| Water to | 1 liter |
| pH adjusted to | 11.7 |

[CD3=4-amino-3-methyl-N-ethyl-(2-methanesulfonamidoethyl)aniline sesquisulfate hydrate.]

A pseudo seasoned fix/stop was made up with the following constitution:

| | |
|---|---|
| Sodium thiosulphate pentahydrate | 20 g |
| Sodium meta bisulphite | 30 g |
| Sodium acetate | 40 g |
| Silver chloride | 1.2 g |
| Water to | 1 liter |

The pH of the fix/stop measured at 25C was adjusted to 6.3 with sodium hydroxide.

Effluent=6 parts developer+5 parts fix/stop+20 parts water.

Molybdate ions were first adsorbed on an anionic resin using the following method. 10 g of Amberlite® IRA-400 exchange resin (manufactured by Rohm and Haas) was stirred gently in 50 ml demineralised water. To this was added 2 ml 1% ammonium molybdate solution. This mixture was stirred for 10 minutes and then the liquid was decanted from the resin and the resin was washed with 3×50 ml changes of demineralised water. The drain resin was used for the following experiments.

100 ml of effluent at room temperature (22C) were placed in a 150 ml beaker on a magnetic stirrer and stirred gently.

A glass pH electrode and calomel reference electrode were placed in the solution and connected to a Radiometer pH meter, the meter having being calibrated previously with reference pH buffers. The pH was recorded. 30 ml of 3% hydrogen peroxide were quickly added and the pH was recorded after 10 sec and then as felt appropriate until the pH stayed constant. At the end of the run the treated liquid was removed and analyzed for molybdenum by atomic adsorption spectroscopy. To demonstrate the invention the experiment was repeated with the 10 g treated resin added. At the end of the run the resin was filtered off before the treated liquid was sent for molybdenum analysis as before. The experiment was again repeated but this time with 2 ml 1% ammonium molybdate added directly to the mixture of effluent and peroxide with no resin present.

The levels of molybdenum in the treated effluent are shown in the following table:

| Effluent treatment | MO in Final Effluent PPM |
|---|---|
| Peroxide only | <0.05 |
| Peroxide + molybdate adsorbed on resin | 0.55 |
| Peroxide + molybdate | 86 |

Figure 1:
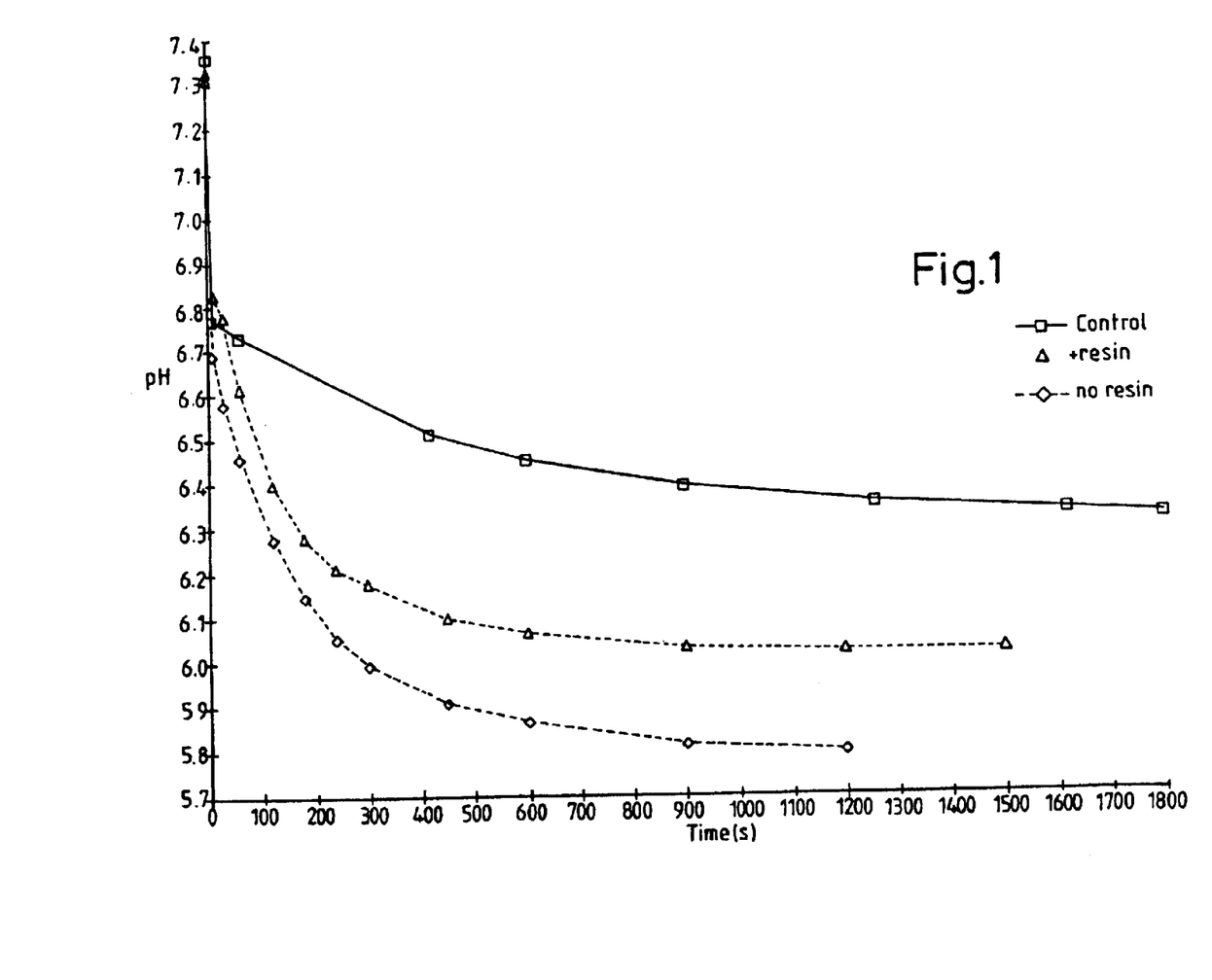
FIG. 1 is a pH versus time graph for effluent reaction with peroxide with resin, without resin and a control without molybdate.

The destruction of sulphite and thiosulphate in the "mock" photographic effluent was monitored by observing the pH change with time. The reactions taking place in the mixture are as follows:

$$SO_3^{2-} + H_2O_2 \rightarrow SO_4^{2-} + H_2O \qquad \text{Reaction 1}$$

$$HO_3^- + H_2O_2 \rightarrow SO_4^{2-} + H^+ \qquad \text{Reaction 2}$$

$$2S_2O_3^{2-} + H_2O_2 + 2H^+ \rightarrow S_4O_6^{2-} + 2H_2O \qquad \text{Reaction 3}$$

$$S_4O_6^{2-} + 7H_2O_2 \rightarrow SO_4^{22-} + 4H_2O + 6H^+ \qquad \text{Reaction 4}$$

$$2H_2O_2 \rightarrow 2H_2O + O_2 \qquad \text{Reaction 5}$$

The pH of the mixture starts at around 7. At this pH almost all the sulphite in the mixture will be protonated as the bisulphite and of the first two reactions, reaction 2 will be the more important, so as the reaction takes place the pH should fall as protons are liberated. Reaction 3 must take place before reaction 4. Reaction 3 causes the pH to rise as protons are used and the reaction 4 takes over and the pH falls again. Thus the pH can be used to follow the reaction. Reaction 5, the peroxide decomposition reaction does not change the pH.

The pH versus time curves for these runs are shown in FIG. 1. The initial pH in all runs fell rapidly leaving the thiosulphate to react. The oxidation of thiosulphate in the run containing the resin with molybdate adsorbed was about three time faster than the run without a catalyst. The final pH was also lower suggesting that the reaction had proceeded further. Although the thiosulphate was removed faster and more completely by the run containing the equivalent amount of unadsorbed molybdate, the molybdenum in the effluent was about 150 times greater. This experiment shows that molybdate adsorbed on a resin is an efficient catalyst for the oxidation of photographic effluent with very little molybdenum entering the waste stream.

EXAMPLE 2

Figure 2:
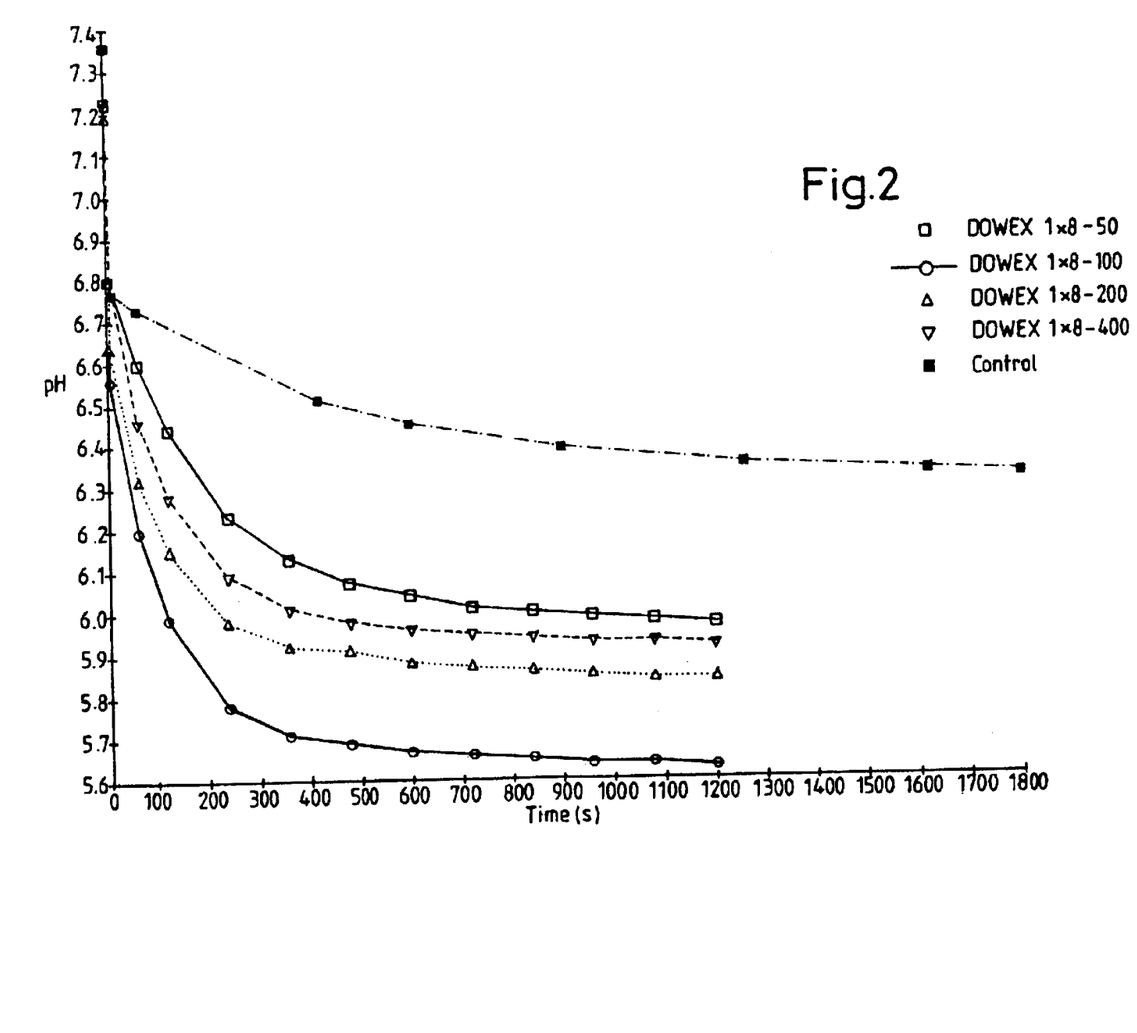
FIG. 2 shows the use of a number of Dowex 1×8 series resins, and also a control.

Example 1 was repeated with a series of Dowex 1×8 anionic ion-exchange resins. This series has resins of different bead sizes, the last number in the resin's name being the approximate mesh size of the beads, 50 being the largest and 400 the smallest. The 100 mesh beads were found to provide the best catalysis for the reaction, which was surprising as it would have been expected that the smaller bead with the greater surface area would be the most effective. The resulting pH curves are shown with a control, containing no molybdate, as FIG. 2.

EXAMPLE 3

Figure 3:
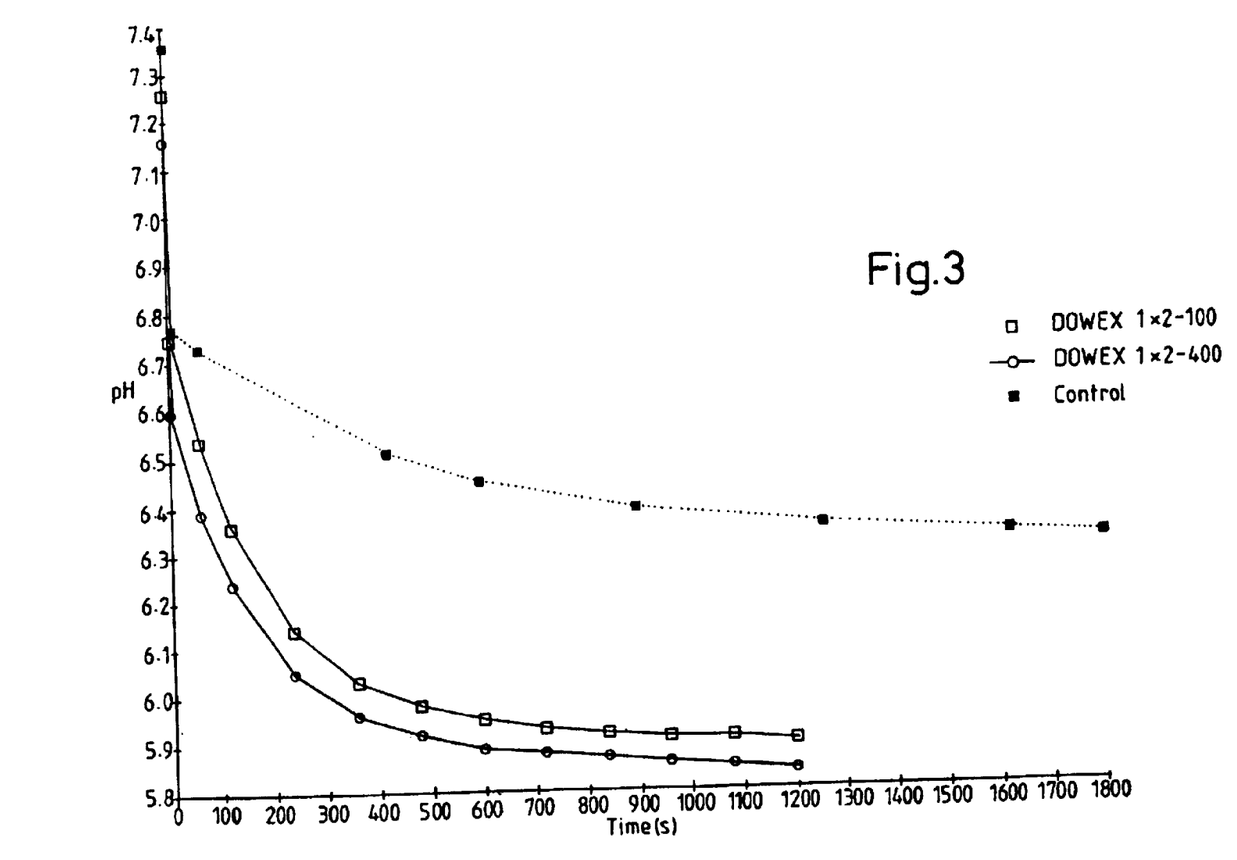
FIG. 3 shows the use of Dowex 1×2 series resins, and also a control.

Example 1 was repeated with two Dowex 1×2 anionic ion-exchange resins, having a different amount of cross-linking compared to the 1×8 series. The resulting pH curves are shown with a control, containing no molybdate, as FIG. 3. The reaction rates were similar to those in Example 2, but there was less difference between the 100 and 400 mesh size resins.

EXAMPLE 4

Figure 4:
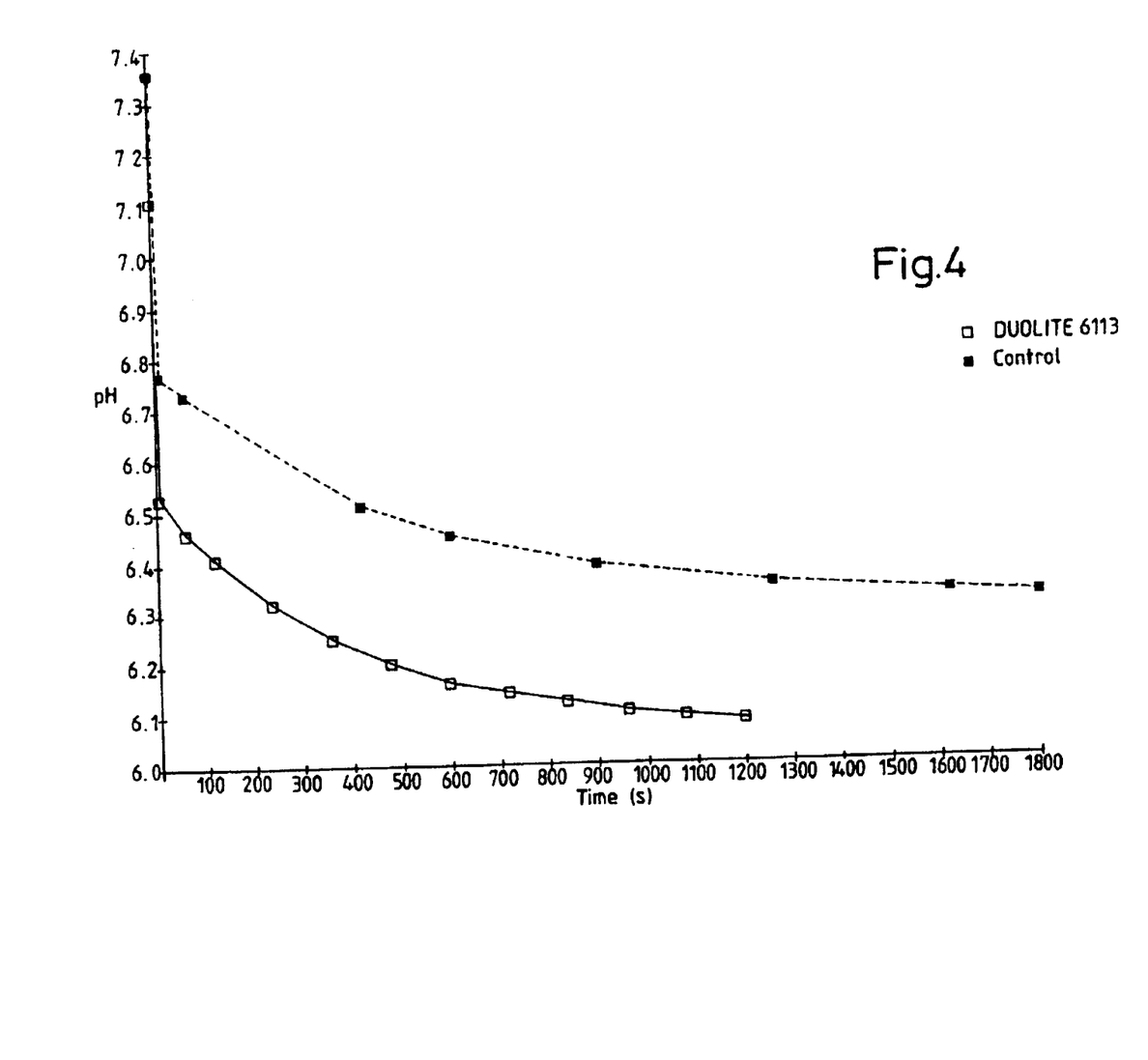
FIG. 4 shows the use of a Duolite 6113 mixed-bed resin, and a control.

Example 1 was repeated with a Duolite 6113 resin, a mixed bed resin comprising a mixture of anionic and cationic resins. The resulting pH curves are shown with a control, containing no molybdate, as FIG. 4. The mixed bed resin+molybdate showed some increased reaction rate over the control but was not as good as the pure anionic exchange resins.

Figure 5:
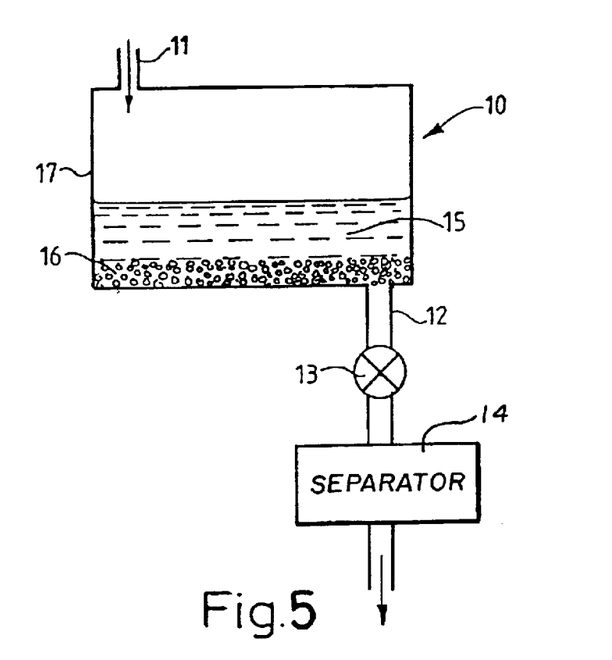
FIG. 5 shows the holding tank for performing the treatment method of the present invention.
Figure 6:
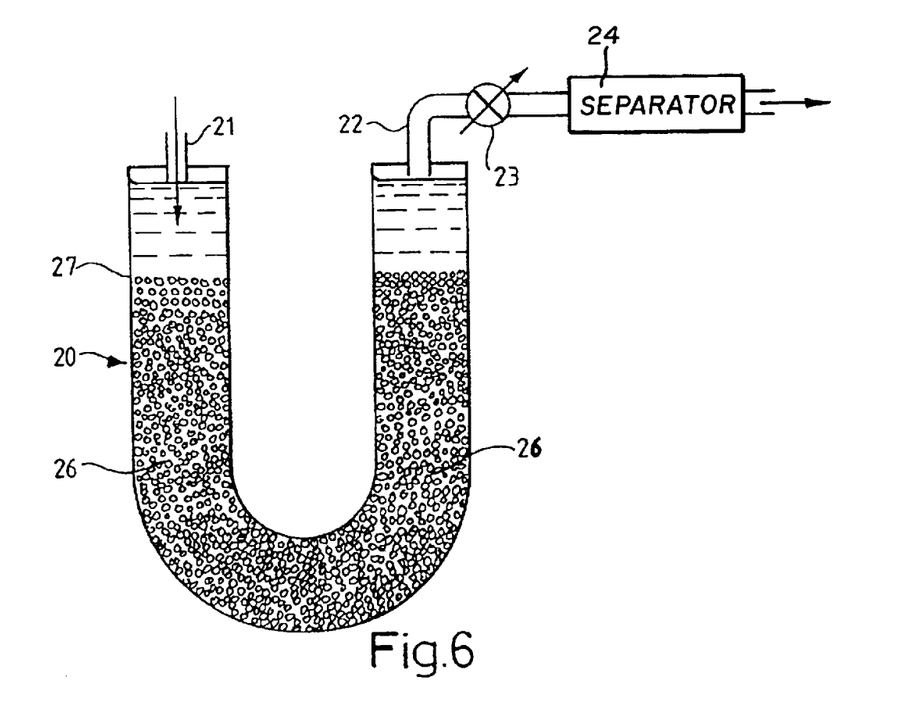
FIG. 6 shows a conduit in accordance with the present invention for performing the treatment method.

In practice, the treatment method according to the present invention may be performed batch-wise in a holding tank apparatus (10) as illustrated in FIG. 5 or using a continuous feed from a photographic development process, in which case a conduit apparatus (20) of the kind illustrated in FIG. 6 may be employed.

The holding tank (17) is equipped with an inlet (11) for receiving photographic effluents batch-wise from a photographic development process. The effluents from the various stages of the process may be treated separately, or may preferably be combined and treated together. The holding tank (17) is also fitted with an outlet (12) which is provided with a manually operable valve (13). The outlet (12) is arranged for discharging treated effluents from the holding tank (17) to waste, e.g. in a public utility sewage system, via a separator (14) for separating precipitated silver species from the treated effluents.

The holding tank (17) contains a bed (15) of anion exchange resin (16). Alternatively a mixed bed of cation and anion exchange resins may be used. The exchange resin(s) (16) is prior-treated with a solution of a chromate, vanadate or preferably tungstate or molybdate salt as hereinbefore described, so as to immobilize the transition metal oxyanion on the exchange resin(s).

In service, photographic effluents from the development process are introduced batch-wise to the holding tank (17) through inlet (11) with valve (13) in the closed position. If necessary, peroxide, in the form of hydrogen peroxide, or a metal or organic peroxide capable of releasing hydrogen peroxide on contact with water, may be introduced to the holding tank (17) at this stage. Where the treatment is carried out on effluents from an RX development process however, the effluents may themselves already contain sufficient hydrogen peroxide.

The effluents and peroxide are allowed to stand in the holding tank (17) in contact with the ion exchange resin (16) for a predetermined period of time sufficient to allow substantially complete reaction of the hydrogen peroxide with sulphite and thiosulphate anions in the effluents, for example, for a period of less than 1 hour. This reaction is catalyzed by the transition metal oxyanions supported on the exchange resin beads (16), and forms sulphate anions.

The valve (13) is then opened, allowing the effluents to be discharged in the holding tank (17) through the outlet (12). Any precipitated silver species are removed by the separator (14), which may be a filter or centrifuge, and the effluents can then be discharged to waste.

Alternatively, the photographic effluents can be introduced continuously from the photographic development process to the conduit apparatus (20) as shown in FIG. 6. In this embodiment, the conduit (27) is generally U-shaped, but different configurations may be employed as desired. The conduit (27) comprises an inlet (21) and an outlet (22) and is packed as shown in FIG. 6 with a porous bed of ion exchange resin (26) as previously described. The outlet (22) is equipped with a manually adjustable valve (23) which is operated to control the flow rate of effluents through the conduit (27), such that the average residence time of the effluent in the conduit (27) is sufficient to allow substantially complete destruction of sulphite and thiosulphate to sulphate, for example, preferably less than 1 hour. The effluent is then discharged to waste via a separator (24) as hereinbefore described.

EXAMPLE 5

A fixer solution comprising seasoned fixer taken from a graphic arts processor was analyzed and found to contain:

| | |
|---|---|
| ammonium thiosulphate | 142 g/l |
| sodium sulphite | 12 g/l |
| silver (complexed) | 16.2 g/l |

The formula of a hydrogen peroxide/potassium bicarbonate treating solution was as follows:

| | |
|---|---|
| 30% hydrogen peroxide | 250 ml |
| potassium bicarbonate | 50 g |
| water to | 1 liter |

The experiment was run with and without bicarbonate in the solution, the final pH being measured in both cases. In the run without bicarbonate the pH of the treated effluent was at an environmentally unacceptable pH of 2.1. When bicarbonate was present together with the peroxide the pH of the treated effluent was satisfactory at 6.5.

To test the efficacy of the peroxide/bicarbonate solution in storage, the combined solution was kept for a period of 4 weeks under normal conditions and the above experiment repeated. The pH was found to be 6.5 as before. The level of peroxide in the combined solution was analyzed by standard iodide titration and found to have decreased by only 0.8%.

The experiment was repeated using however a peroxide/sodim hydroxide solution containing 20 g/l sodium hydroxide and having the same neutralizing power as the above. After 4 weeks the solution had completely decomposed and no peroxide was detected.

Figure 7:
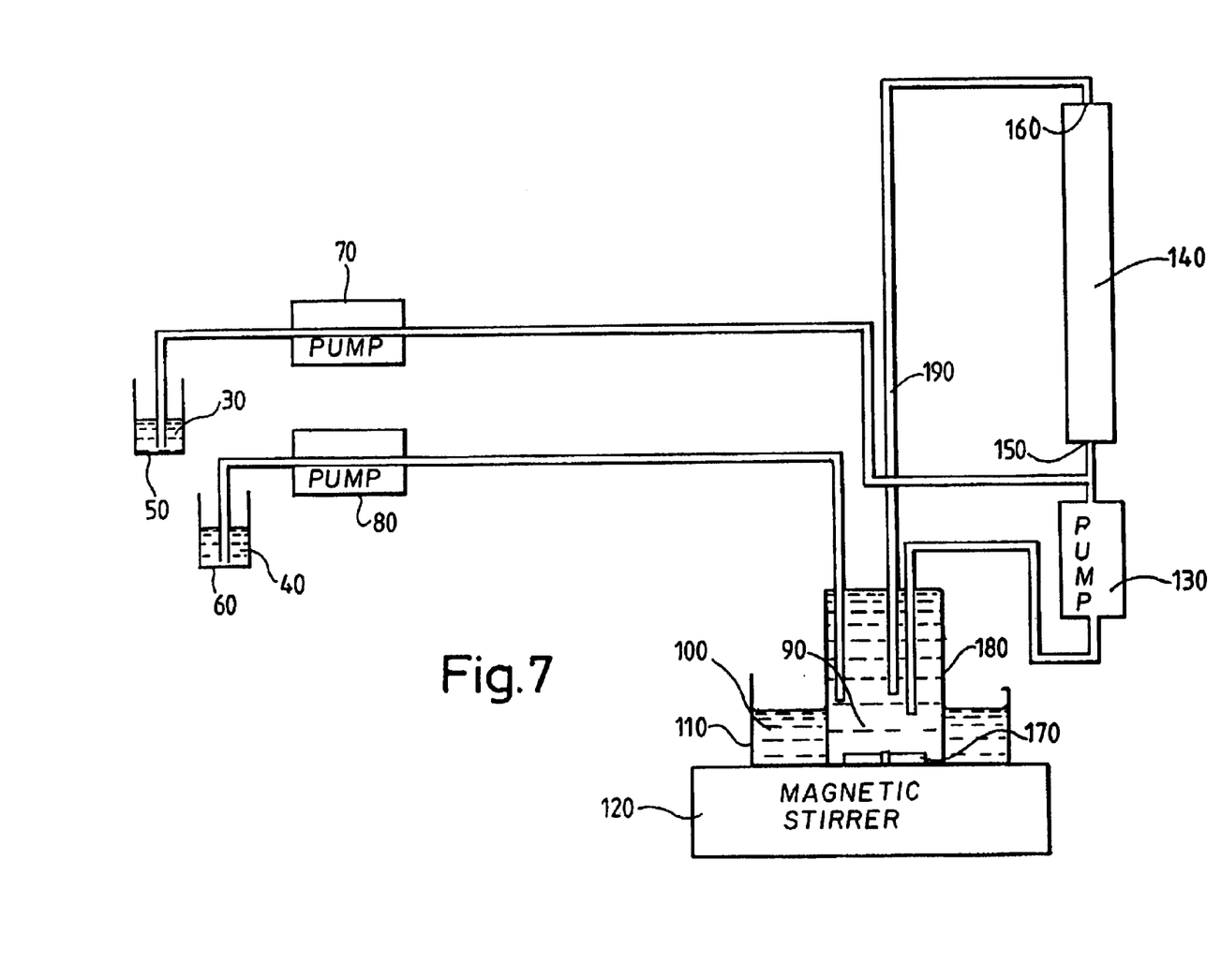
FIG. 7 shows an experimental set-up to demonstrate the use of a storable peroxide/alkali combination in a process according to the invention.

The experimental set-up for the above experiment was as shown in FIG. 7. A peroxide/bicarbonate solution (30) having the quantities above and the seasoned fixer (40) described above were introduced into vessels (50) and (60) respectively. Molybdate ions were adsorbed onto an anionic resin (140) as described in Example 1 except that the resin used was Amberlite ® IRA-458 exchange resin (manufactured by Rohm and Haas), which is a polyacrylate resin. In an additional experiment the alternative polystyrene anionic exchange resin Amberlite ® IRA-68 was used.

The 'mock' effluent containing fixer solution (40) was then pumped via pump (80) to the holding tank (180), which initially only contained water, within overflow vessel (110) on a magnetic stirrer (120) and the solution (90) being treated was stirred gently. A glass pH electrode and calomel reference electrode were placed in the solution and connected to a Radiometer pH meter, as described in Example 1, for measuring the pH at predetermined intervals. The solution (90) in the holding tank (180) was then pumped, via pump (130), to combine with the peroxide/bicarbonate solution (30), pumped via pump (70), to pass over the resin bed, equipped with filters (150,160) at either end and containing resin (140). After passing through the bed the treated effluent (190) was introduced back into the holding tank (180) and allowed to form an overflow (100) into the vessel (110).

What is claimed is:

1. A method of treating waste photographic effluent containing reduced species by oxidation with hydrogen peroxide, or a compound capable of releasing hydrogen peroxide, in the presence of a catalyst therefor, selected from the group consisting of molybdate, tungstate, chromate and vanadate, wherein said catalyst is immobilised on a substrate therefor comprising an anion exchange material.

2. A method as in claim 1 characterised in that the effluent is from a process with a redox-amplifier developer.

3. A method as claimed in claim 1 characterised in that the reduced species are sulphur-oxygen species.

4. A method as claimed in claim 3 characterised in that the sulphur-oxygen species are thiosulphate or sulphite.

5. A method as in claim 1 characterised in that the effluent is from a process wherein the fixer contains an amount of sulphur-oxygen species greater than about 20 g of thiosulphate based on ammonium thiosulphate.

6. A method as claimed in claim 1 wherein the catalyst is a molybdate.

7. A method as in claim 1 characterised in that hydrogen peroxide, or a compound capable of releasing hydrogen peroxide, is combined with a soluble alkali whose conjugate acid has a pKa of <8.5, prior to reaction with the effluent, to reduce the final pH of the effluent to about 5 to 9.

8. A method as in claim 7 characterised in that the alkali is a soluble bicarbonate, alkanoate or dihydrogen phosphate.

9. A method as claimed in claim 8 characterised in that the alkali is potassium bicarbonate.

* * * * *